United States Patent [19]

Gallenberg

[11] Patent Number: 4,971,594
[45] Date of Patent: Nov. 20, 1990

[54] APPARATUS FOR HARVESTING GINSENG ROOTS

[76] Inventor: Anton Gallenberg, N. 4603 Polar Rd., Bryant, Wis. 54419

[21] Appl. No.: 411,408

[22] Filed: Sep. 22, 1989

[51] Int. Cl.⁵ .................. A01D 17/00; B07B 4/02; B07B 9/00; B07B 1/00

[52] U.S. Cl. .................. 460/100; 460/143; 460/144; 56/16.5; 171/17; 209/34; 209/44.2; 209/137

[58] Field of Search .............. 56/16.5, 327.1; 460/22, 460/99, 100, 114, 123, 143, 144, 904; 171/17, 23; 209/12, 30, 32–35, 137, 692, 693, 44.1, 44.2

[56] References Cited

U.S. PATENT DOCUMENTS

| | | | |
|---|---|---|---|
| Re. 23,827 | 5/1954 | Peterson | 171/17 |
| 1,107,965 | 8/1914 | Klinghammer | 171/17 |
| 1,232,086 | 7/1917 | Redding | 171/17 |
| 1,279,793 | 9/1918 | Upton et al. | 55/136 |
| 1,715,218 | 5/1929 | Wright et al. | 171/17 |
| 1,855,549 | 4/1932 | Gookin | 171/17 |
| 2,373,426 | 4/1945 | Spafford | 171/17 |
| 2,553,519 | 5/1951 | Lenz | 171/17 |
| 2,612,993 | 10/1952 | Levesque | 171/17 |
| 2,621,456 | 12/1952 | Peterson | 171/17 |
| 2,693,068 | 11/1954 | Redin | 171/17 |
| 2,997,172 | 8/1961 | Wright | 171/17 |
| 3,107,475 | 10/1963 | Gustafson | 56/328 |
| 3,227,276 | 1/1966 | Leighton et al. | 209/139 |
| 3,429,438 | 2/1969 | Palmen et al. | 209/137 |
| 3,469,691 | 9/1969 | Boyce | 209/133 |
| 3,596,716 | 8/1971 | Hoffman | 171/17 |
| 3,620,369 | 11/1971 | Steen et al. | 209/3 |
| 3,630,009 | 12/1971 | Ashton | 209/137 |
| 3,854,585 | 12/1974 | Herkes | 209/34 |
| 4,174,001 | 11/1979 | Ellis | 171/17 |

FOREIGN PATENT DOCUMENTS 3529416  2/1987  Fed. Rep. of Germany ...... 460/143

*Primary Examiner*—Bruce M. Kisliuk
*Attorney, Agent, or Firm*—Dorsey & Whitney

[57] ABSTRACT

An automated ginseng root harvester having a feeder conveyor, an air flow for separating ginseng roots from various heavier and lighter objects, a pair of lateral separation conveyors, an inclined conveyor extending in the direction of the air flow and a plurality of further conveyors for inspection and collection of the ginseng roots. The implement of the present invention dramatically reduces the manual labor involved in ginseng root harvest and insures substantially complete collection of all roots in a single harvest operation.

26 Claims, 3 Drawing Sheets

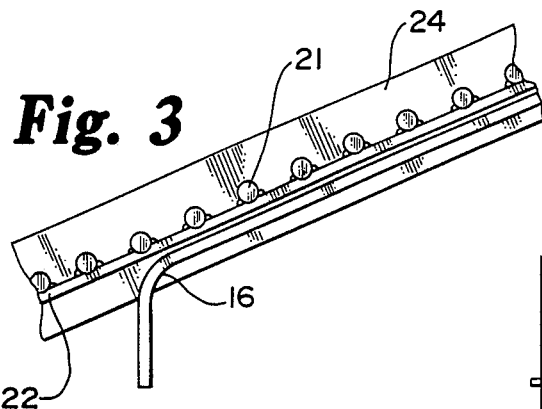
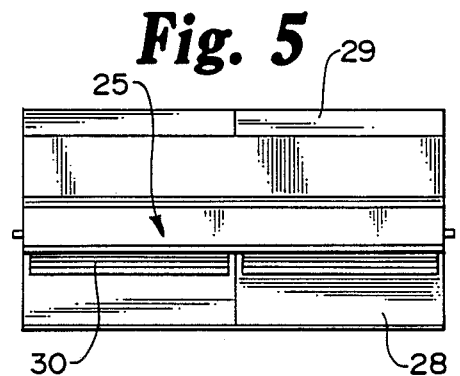
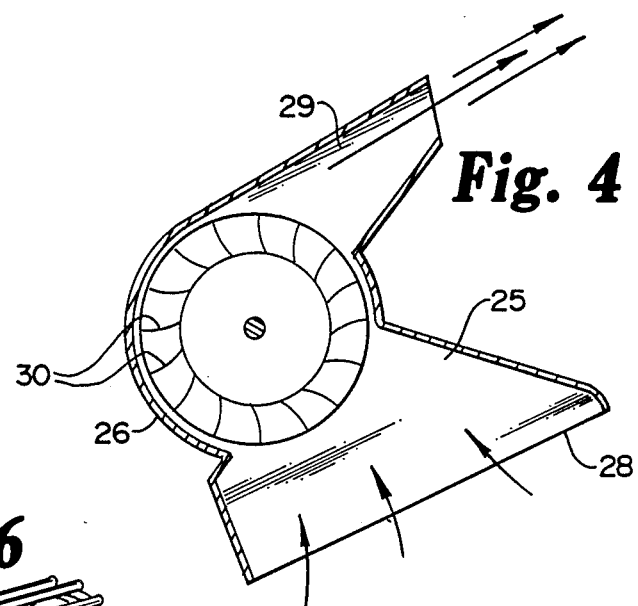
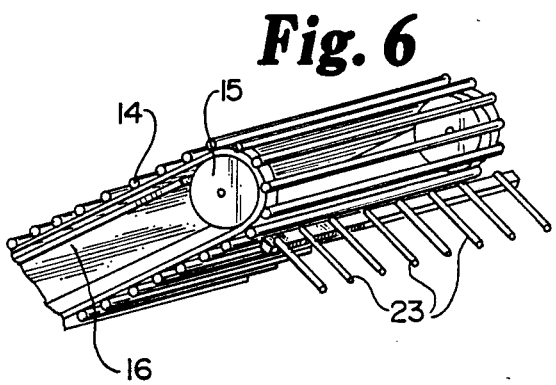

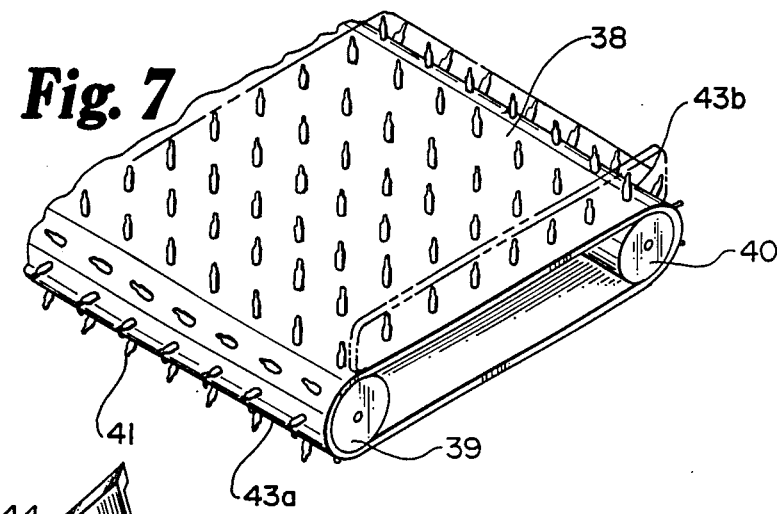
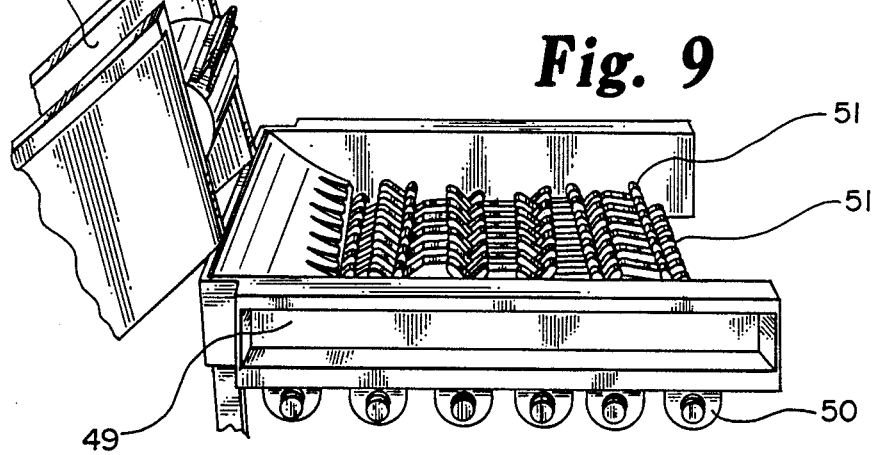
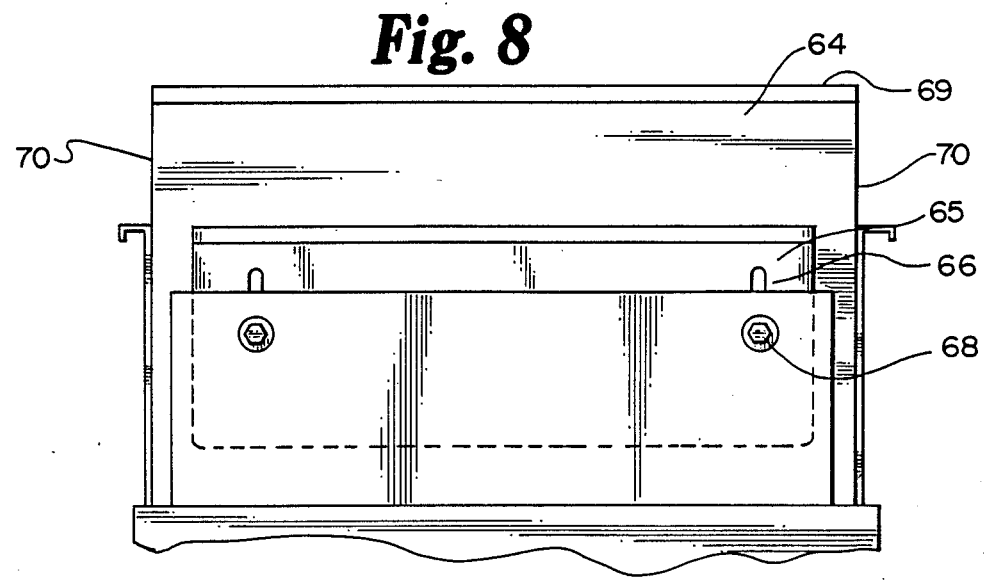

APPARATUS FOR HARVESTING GINSENG ROOTS

BACKGROUND OF THE INVENTION

A. Field Of The Invention

The present invention relates generally to a tractor-pulled implement for harvesting ginseng roots, and more particularly, to an apparatus for harvesting ginseng roots which dramatically reduces labor costs associated with ginseng harvesting, while resulting in a highly efficient and complete harvesting of the ginseng roots.

B. Description Of The Prior Art

Ginseng is a Chinese perennial herb having an aromatic root which is highly valued in China and other parts of the world as a medicine and for other uses. Historically, ginseng has been grown in China and other parts of the world, with very little, if any being grown in the United States. In more recent years, however, various areas in the United States have been found to have the right soil conditions, weather, etc. to support the growth of this plant. The main component of the ginseng plants grown in the United States is the ginseng root. These roots are traditionally harvested by utilizing a tractor-pulled potato type digger. Such a device includes a forward digger blade which is lowered into the ground to unearth the ginseng roots and remove them from their natural state. The digger blade transfers everything which is dug from the earth, including ginseng roots, rocks, mud, weeds, grasses and other debris to a draper or hook chain conveyor which conveys the same upwardly and rearwardly. During this rearward conveyance, the soil is broken up, either by mechanical or natural chain agitation and sifts through the chain to return to the ground. Most of the ginseng roots and larger debris are conveyed to the back end of the chain conveyor and deposited back onto the ground behind the machine. Personnel are then employed to manually gather the ginseng roots. Such a harvesting method is, of course, highly labor intensive.

Because ginseng roots are small by nature, ranging from pencil size to hand size, they will occasionally shake through the chain conveyor with the soil and end up reburied by soil and other debris. Because of the high value of ginseng roots, this necessitates a second or even a third harvest to uncover and collect these additional ginseng roots.

There are, of course, a large number of automated devices currently existing which are used in the harvesting of various root crops or other fruits and vegetables. Many of these include a fan or other pneumatic flow to separate the harvested product from the rocks or other heavier debris. For example, the Gustafson Patent No. 3,107,475 discloses a nut harvesting and separating machine and uses a flow of air to separate almonds from leaves and heavier articles. The Leighton et al. Patent No. 3,227,276 relates to an air suction potato conveyor harvesting machine which utilizes an air flow to cause the potatoes to be separated from leaves and lighter objects as well as from rocks and other heavier objects. The Boyce Patent No. 3,469,691 relates to an aerodynamic sorting device for separating smooth objects from rough, contoured objects. The Hoffman Patent No. 3,596,716 relates to a pneumatic potato harvester and functions by using an air flow or air suction to cause the potatoes to flow onto a conveyor belt, while permitting heavier objects to be discarded earlier.

Although a number of prior art patents, including those described above, utilize air flow to assist in separating the desired fruit, vegetable or other product from unwanted debris, particular problems exist in the harvesting of ginseng roots which are not present in the harvesting of these other products. First, the ginseng root is extremely valuable. At current market conditions, ginseng roots sell for as much as $63.00 per pound. Thus, it is extremely important that virtually all ginseng roots are harvested. Secondly, depending on the particular development of the ginseng root, the soil conditions and the difference in size of ginseng roots which range from pencil size to hand size, the ability to collect and harvest all of the roots becomes increasingly difficult.

Accordingly, there is a need for an automated ginseng root harvesting apparatus and implement which dramatically reduces, if not eliminates, the highly labor intensive harvesting techniques currently employed, and which results in the harvesting of virtually all of the ginseng roots in a single harvesting operation.

SUMMARY OF THE INVENTION

In contrast to the prior art, the harvesting apparatus of the present invention dramatically reduces the use of manual labor in the harvesting of ginseng roots and results in the collection and harvesting of virtually all of the ginseng roots in a single harvesting operation.

More specifically, the apparatus and implement of the present invention utilizes a forwardly positioned digger blade which is inserted into the soil to unearth the ginseng roots and convey the same together with associated soil and other materials onto an upwardly and rearwardly moving chain link feeder conveyor. During this movement up this feeder conveyor, soil sifts through the chain links and is deposited back onto the ground. To accommodate the smaller ginseng roots and to insure that they do not also sift through the chain links along with the soil, a slider pan is provided near the rearward end of the feeder conveyor.

As the ginseng roots, rocks, soil clumps and other debris reach the top of and are discharged from the feeder conveyor, they are subjected to an upwardly and rearwardly directed flow of air. This air flow acts on the material exiting from the feeder conveyor to deposit the material either onto a first laterally moving belt conveyor, a short inclined conveyor moving in the same general direction as the air flow, onto a second laterally moving belt conveyor, or by causing particles to be blown outwardly from the device past all three conveyors. During operation of the preferred apparatus, the heavier objects such as rocks, large soil clumps, etc. fall off the feeder conveyor and drop onto the first lateral conveyor. A plurality of finger projections are provided at the discharge end of the feeder conveyor to slow the descent of these materials. These materials are ultimately conveyed to the forward end of the machine to a first inspection conveyor where personnel are employed to collect the limited ginseng roots which are on this conveyor. The remaining material remains on the first inspection conveyor and is ultimately deposited back onto the ground.

The objects which are not deposited on the first lateral conveyor by the air flow are blown past the first lateral conveyor with some being deposited onto the inclined conveyor which carries such materials upwardly and rearwardly to a discharge end where they are deposited onto a second lateral conveyor. This short, inclined conveyor's provided with a plurality of short, rubber, finger-like projections which tend to catch the ginseng roots and convey the same upwardly, while allowing large soil clumps, rocks and the like to roll back down, as a result of the incline, onto the first lateral conveyor. The ginseng roots and other limited debris which are deposited onto the second lateral conveyor are ultimately conveyed to the forward end of the harvester where personnel are employed to remove rocks and other undesirable debris from the roots. The roots are then conveyed to a holding bin.

The lighter objects falling from the initial conveyor, such as grass blades, straw stalks and the like are caused by the air flow to be carried over all three conveyors past the back end of the machine and back onto the ground.

In the preferred embodiment, the fan devloping the air flow extends across the entire width of the apparatus so that a consistent air flow is generated across the entire width of the material being conveyed up the feeder conveyor. The apparatus is also provided with an adjustable air shroud over the rear end of the harvesting device to contain and control the air flow. This shroud prevents the air stream from dissipating and permits it to perform the desired separating function.

Accordingly, it is an object of the present invention to provide an automated ginseng root harvester.

Another object of the present invention is to provide an apparatus for harvesting ginseng roots which dramatically reduces the labor intensive procedure normally associated with ginseng root harvesting.

A further object of the present invention is to provide an automated ginseng root harvester which is effective to harvest virtually all of the ginseng roots in a harvesting operation.

A still further object of the present invention is to provide an apparatus for harvesting ginseng roots which utilizes a flow of air to assist in separating ginseng roots from unwanted debris.

These and other objects of the present invention will become apparent with reference to the drawings, the description of the preferred embodiment and the appended claims.

DESCRIPTION OF THE DRAWINGS.

FIG. 3 is a fragmentary side view of a portion of the feeder conveyor showing a portion of the slider pan.

FIG. 4 is a side view of the fan means with one end removed.

FIG. 5 is a rear view of the fan means.

FIG. 6 is a fragmentary perspective view showing the finger-like projections at the discharge end of the feeder conveyor.

FIG. 7 is a fragmentary perspective view of the inclined conveyor.

FIG. 8 is a rear view of the adjustable deflection surface.

FIG. 9 is a fragmentary perspective view of the upper end of the second transport conveyor and the star roller conveyor.

DESCRIPTION OF THE PREFERRED EMBODIMENT

Figure 1:
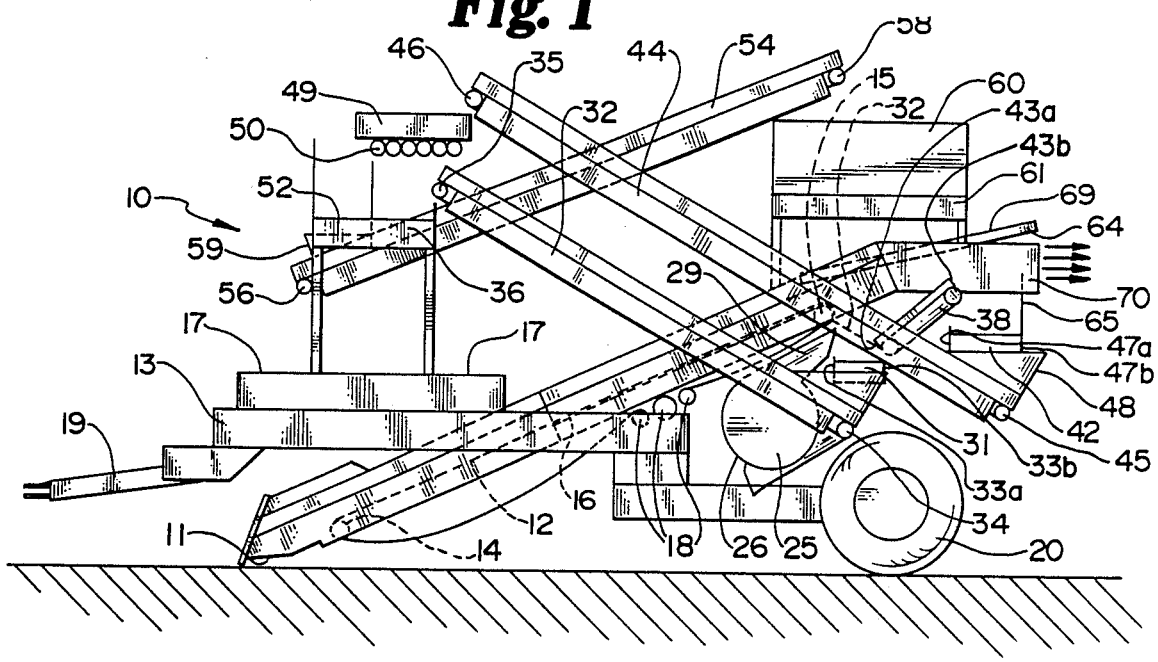
FIG. 1 is a side elevational view of the ginseng root harvester of the present invention.
Figure 2:
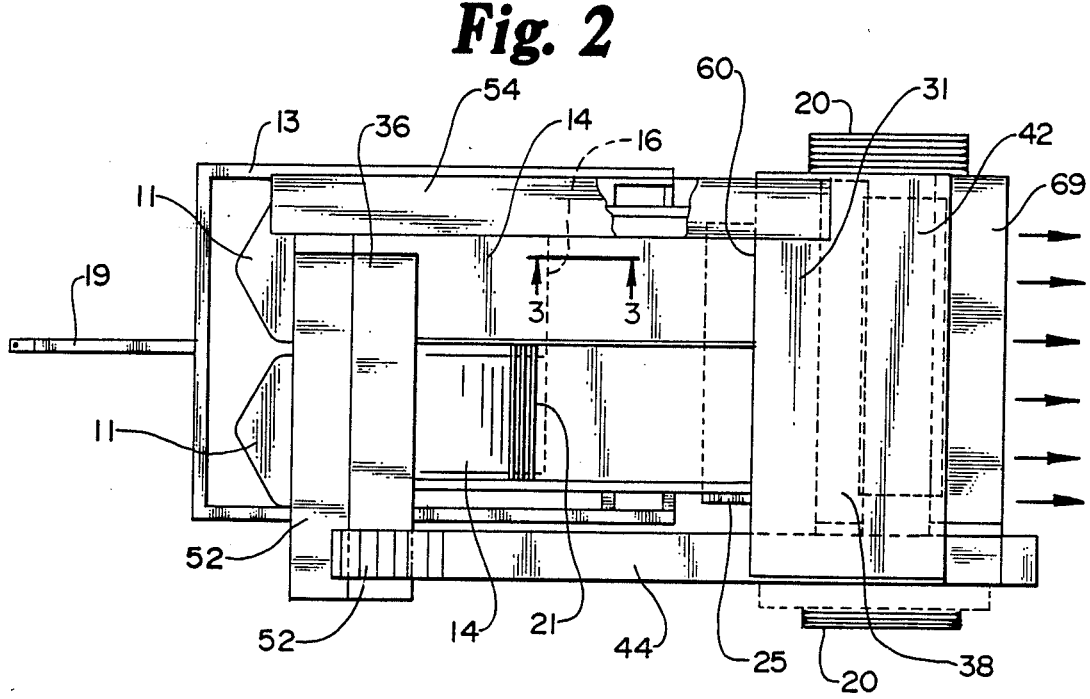
FIG. 2 is a top elevational view of the ginseng root harvester of the present invention.

Reference is first made to FIGS. 1 and 2 in which the general reference numeral 10 designates the ginseng root harvester of the present invention. The harvester 10 of the preferred embodiment is a tractor pulled implement having a rigid frame structure 13 supported by a pair of rearward wheels 20 and provided with a forward hitch member 19 for connection to a tractor or other towing vehicle. An inspector personnel platform is connected to and supported by the frame structure 13.

The forward end of the harvesting device 10 includes a pair of spaced digger blades 11 which are inserted into the soil to unearth the ginseng roots. The side view of FIG. 1 illustrates the blade 11 in a position generally aligned with the top surface of the soil. Appropriate lowering means are provided to the device 10 for selectively lowering the blade 11 so that it is inserted into the soil beneath the ginseng roots during the harvesting procedure. Such a lowering mechanism is conventional in the art. As shown in FIG. 2, the blades 11 are spaced apart to correspond with the spaced rows of ginseng plants.

Positioned immediately to the rear of each of the digger blades 11 is an upwardly and rearwardly extending feeder conveyor 12. The feeder conveyor 12 is comprised of a plurality of horizontally disposed, spaced rod or bar members 21 and is supported for upward and rearward movement about generally laterally disposed receiving and discharge end rollers 14 and 5, respectively. A drive roller 18 is provided beneath the conveyor 12 for driving the same. In the preferred embodiment, the roller 18 is driven by a hydraulic motor. The hydraulic motor is driven via a hydraulic pump which is in turn driven by the tractor power take-off (PTO).

During operation, the ginseng roots, soil and other material unearthed by the digger blades 11 is deposited onto the forward end of the conveyor 12. As the conveyor moves upwardly, the loose soil sifts through the conveyor 12 between the rods 21 and falls back onto the ground. This sifting of loose soil is facilitated by the general vibration and movement of the conveyor 12 as it moves upwardly and rearwardly. Generally, large soil chunks and the ginseng roots do not fall through the conveyor 12 but are conveyed upwardly and rearwardly.

The smaller ginseng roots are generally more difficult to deal with as many of them will ultimately shake through the chain conveyor 12, along with the lighter soil, and will be reburied by the soil clumps as they are broken up. This is a particular problem when plant diseases or weather conditions necessitate harvesting the ginseng roots prematurely (after two or three years, instead of four). This generally results in smaller ginseng roots and smaller soil clumps. To substantially reduce if not eliminate the loss of these smaller ginseng roots through the conveyor 12, a slider pan 16 is provided directly beneath the conveyor 12 near its upper end. As illustrated best in FIG. 3, this slider pan 16 is stationary and is positioned immediately below the upper surface of the conveyor 12 so that the material conveyed is simply caused to slide along the pan 16. This prevents loss of the smaller ginseng roots. In the preferred embodiment, as illustrated best in FIGS. 1 and 2, the slider pan 3 is disposed beneath the upper surface of the conveyor 12 for a distance of at least the upper one half of the total length of the conveyor 12. In the preferred embodiment, the slider pan 16 is constructed of ultra high molecular weight (UHMW) polyethylene.

As the materials (roots, rocks, soil clumps and other debris) reach the top end of the conveyor 12, they drop off the discharge end of the conveyor 12 and pass through an upwardly and rearwardly flowing stream of air produced by the fan 25. As illustrated best in FIGS. 1, 4 and 5, the fan 25 is positioned below the upper end of the conveyor 12 and includes a generally cylindrical fan chamber 26, a lower air intake portion 28 and an upwardly and rearwardly extending air discharge section 29 for directing the air flow upwardly and rearwardly to intersect with the material dropping off the end of the conveyor 12.

As illustrated best in FIG. 4, the fan 25 includes an internal rotatable cylinder with a plurality of peripheral fan blades 30 which is rotated in a clockwise direction as illustrated. The fan 25 in the preferred embodiment is powered by a separate internal combustion engine (not shown) with adjustable speeds mounted on the harvesting device 10. The width of the fan 25 approximates the width of the discharge end of the feeder conveyor 12 so that all of the material discharged from the conveyor 12 is subjected to the air flow.

As the materials drop off the upper end of the conveyor 12 and are subjected to the air flow, the air flow has little effect on heavier objects such as rocks, large soil clumps, etc. These heavier objects fall quickly onto a first lateral belt conveyor 31 which, as illustrated best in FIG. 1, is positioned below the upper end of the conveyor 12 and which runs laterally in a plane generally perpendicular to the forward movement of the implement 10. The conveyor 31 includes a first or forward side 33a positioned below the discharge end of the conveyor 12 so that material discharged from the conveyor 12 will be deposited onto the conveyor 31. A second or rearward side 33b of the conveyor 31 is spaced rearwardly from the side 33a.

Positioned at the discharge end of the conveyor 12 and extending downwardly and to the rear of the conveyor 12 are a plurality of spaced finger like projections 23. These projections 23 slow the descent of the material discharged from the conveyor 12, thereby providing for better air stream separation effectiveness as well as reducing the chance of heavier objects, etc. falling into the fan 25. As illustrated in FIG. 6, these projections 23 are laterally spaced across the entire width of the conveyor 12. In the preferred embodiment, the projections 23 are cylindrically shaped, are constructed of steel and are approximately 8 inches long.

Although most of the material which falls onto the first lateral belt conveyor 31 will be rocks, large soil clumps and other heavy objects, a limited number of ginseng roots will also be deposited onto the conveyor 31 either because they are connected to large soil clumps, are forced by large soil clumps or the like to fall onto the conveyor 31 or for various reasons are not subjected to the full force of the air flow. This material on the belt conveyor 31 is conveyed to one side of the implement 10 and deposited onto a first or lower inclined transport belt conveyor 32. A hopper 37 is provided at the lower or rearward end of the conveyor 32 to assist in transferring material to the conveyor 32.

The belt conveyor 32 is a conventional endless belt conveyor having rollers 34 and 35 at its ends. The first transport conveyor 32 conveys the material received from the first lateral conveyor 31 upwardly and forwardly toward the forward end of the implement 10 at which point the material is deposited onto a first, laterally extending inspection conveyor 36. In the preferred embodiment, the first inspection conveyor 36 is generally horizontally disposed and is a conventional endless belt conveyor. The conveyor 36 conveys the material laterally across a forward portion of the implement 10. Personnel are positioned alongside the conveyor 36 on the rearward portion of the support platform 17 to examine the objects and material on the conveyor 36 and to pick out any ginseng roots that are present. As will be described in greater detail below, these roots are deposited onto an adjacent, second inspection conveyor 52 or are otherwise collected. The remaining material on the conveyor 36 is conveyed to the opposite side of the implement 10 where it will be deposited back onto the ground.

Lighter objects which exit from the top end of the conveyor 12 and which do not fall onto the first lateral conveyor 31, such as smaller soil clumps and ginseng roots, will be carried a short distance by the the air stream. The velocity of the air stream can be adjusted by increasing the rotational speed of the fan blades so that these desirable items, and in particular the ginseng roots, are carried by the air stream past the first lateral conveyor 31 and onto an inclined belt conveyor 38. As illustrated best in FIG. 1, the conveyor 38 is inclined upwardly and rearwardly relative to the implement 10 and extends in the same general direction as the feeder conveyor 12 and the air stream. Similar to the fan 25, the conveyor 38 extends across substantially the entire width of the feeder conveyor portion of the implement as shown in FIG. 2. The conveyor 38 is provided with upper 40 and lower 39 rollers to support and rotate the same (FIG. 7).

As illustrated best in FIG. 7, the belt of the conveyor 38 is provided with a plurality of projections 41 which extend outwardly from the surface of the conveyor 38. These projections 41 are spaced so that they catch the ginseng roots, while allowing soil clumps and round objects such as rocks, etc. to roll down past the projections 41 onto the first lateral belt conveyor 31. To facilitate this, the lower or receiving end 43a of the conveyor 38 is positioned above the rearward side 33b of the conveyoer 31. As illustrated in the preferred embodiment of FIG. 1, the inclined conveyor 38 is shown at an inclination of approximately 45°. It is contemplated, however, that it can be inclined at various other angles without deviating from the spirit of the present invention. Preferably, however, the conveyor 38 should be inclined at least about 30°, but no more than about 60°.

The inclined belt conveyor 38 carries the ginseng roots and a limited amount of other, undesirable material and debris and deposits the same onto a second lateral belt conveyor 42. The conveyor 42 includes a forward side positioned approximately below the discharge end 43b of the conveyor 38 and a rearward side 47b extending parallel to and spaced from the side 47a. The second lateral conveyor 42 extends laterally across the implement in a direction generally parallel to the first lateral conveyor 31 and generally transverse to the conveyors 12 and 38 and transverse to the forward movement of the implement 10. The conveyor 42 conveys the ginseng roots and other material deposited from the conveyor 38 onto a second or upper inclined transport conveyor 44 positioned on one side of the implement and approximately directly above the first inclined belt conveyor 32. The belt conveyor 44 is a conventional belt conveyor having lower 45 and upper 46 rollers for driving and supporting the endless belt of the conveyor 44. A hopper 48 is provided at the lower end of the conveyor 44 to assist in directing roots and other materials from the second lateral conveyor 42 onto the conveyor 44.

The conveyor 44 extends upwardly and forwardly toward the hitch or forward end of the implement 10 and deposits the roots and other materials onto a relatively short star roller conveyor 49 running generally in the same direction as the conveyor 44. As illustrated in FIG. 9, the star roller conveyor 49 includes a plurality of so-called star rollers 50, each of which include a plurality of projections 51. These star rollers 50, which are conventional in the art, tend to lift the ginseng roots and move them along from one projection to the other. Sufficient space is provided between the star rollers 50 for pulverized soil, small rocks, etc. to fall through. Some ginseng roots, particularly smaller roots, may also occasionally fall through the conveyor 49. For this reason, the conveyor 49 is positioned vertically above the first inspection conveyor 36 as illustrated best in FIGS. 1 and 2. Thus, the materials which fall through the conveyor 49, including the limited number of ginseng roots, will fall directly onto the first inspection conveyor 36. These roots will then be collected by the personnel inspecting the conveyor 36.

The ginseng roots that continue to be carried by the star rollers 50 are eventually deposited onto a second laterally positioned inspection conveyor 52. In the preferred embodiment, the inspection conveyor 52 is a conventional belt conveyor similar to the belt conveyor 36 and is supported at each end and throughout its length by appropriate support rollers or other means. The material which is deposited onto the inspection conveyor 52 is predominantly ginseng roots; however, personnel are positioned alongside the conveyor 52 on the forward end of the platform 17 for inspecting the material on the conveyor 52 and removing unwanted items. Because of the variance in the sizes and shapes of the ginseng roots, it is virtually certain that there will always be some mixture of unwanted materials. Thus, the personnel are provided at this point to fine tune the separation.

The ginseng roots on the inspection conveyor 52 are conveyed laterally to the opposite side of the implement 10 where they are deposited onto an upwardly and rearwardly inclined product belt conveyor 54. As illustrated in FIGS. 1 and 2, this conveyor 54 extends from a forward end of the implement 10 toward the rearward end and deposits the ginseng roots into a holding or collection bin 60. The conveyor 54 is a conventional belt conveyor having lower 56 and upper 58 support rollers and is provided with a hopper 59 at its lower end to assist in transferring the roots from the inspection conveyor 52 to the conveyor 54. As illustrated best in FIG. 2, the collection or holding bin 60 extends laterally across the implement 10 and is provided with a belt conveyor 61 (FIG. 1) in the bottom. The holding bin conveyor 61 is run intermittently to advance the ginseng roots toward a discharge end 62. Preferably, the bin 60 is no wider than the implement 10; however, means are provided for shifting the bin from side to side to facilitate unloading of the bin 60 when desired.

Referring again to the material exiting from the chain conveyor 12, the lightest of objects, including grass blades, straw stalks and the like, are carried over all three conveyors, namely, the first and second lateral conveyors 31 and 42 and the inclined conveyor 38, and outwardly past the back end of the implement to be deposited back on the ground. It is important to eliminate these items since when the ginseng roots are washed, such items tend to stick to the roots and thus detract from their value. It should be noted that the velocity of the fan 25 can be adjusted such that many of the ginseng roots will be projected by the air stream past both the first lateral conveyor and the inclined conveyor 38 and deposited directly onto the second lateral conveyor 42.

The characteristics of the air flow are provided principally by the rotational velocity of the fan 25. The air flow is also defined, however, by an adjustable air shroud 64 which is positioned above the conveyors 31, 38 and 42 and which functions to define the air flow from the fan 25 by deflecting it outwardly and rearwardly. The shroud 64 is provided with a top portion 69 as illustrated in FIG. 1 as well as with side portions 70 as illustrated in FIG. 8. The shroud 64 can be adjusted generally upwardly and downwardly by appropriate adjustment means.

As illustrated best in FIGS. 1 and 8, a rearwardly positioned deflection member 65 is connected to the rearward side 47b of the conveyor 42. The member 65 is provided with adjustment means for selective upward and downward adjustment. In the preferred embodiment, the deflection member 65 is provided with a pair of elongated slots 66 through which a pair of threaded members 68 are provided for retaining the member 65 in its selectively adjusted position.

Except as otherwise noted, each of the conveyors and conveyor sections illustrated in the drawings and described above are conventional conveyors which are supported in a conventional manner and driven in accordance with means known in the art. In the preferred embodiment, each of the various conveyors is driven by a hydraulic motor which is in turn powered by a hydraulic pump driven by the tractor PTO.

Although the description of the preferred embodiment has been quite specific, it is contemplated that various modifications could be made to the preferred embodiment without deviating from the spirit of the present invention. Accordingly, it is contemplated that the scope of the present invention be dictated by the appended claims rather than by the description of the preferred embodiment.

I claim:

1. A ginseng root harvesting apparatus comprising:
   feeder conveyor having a forward feed end and a rearward discharge end for receiving ginseng roots, soil and other debris and conveying the same generally rearwardly from said feed end to said discharge end;
   a first lateral conveyor extending in a direction generally transverse to said feeder conveyor and being positioned below the discharge end of said feeder conveyor;
   an inclined conveyor for conveying materials from a receiving end to a discharge end along a generally upward and rearward path, said inclined conveyor being positioned above said first lateral conveyor;
   a second lateral conveyor extending in a direction generally transverse to said feeder conveyor and being positioned below the discharge end of said inclined conveyor; and
   fan means for creating an upward and rearward flow of air from below the discharge end of said feeder conveyor and above said first lateral conveyor across said first lateral conveyor, said inclined conveyor and said second lateral conveyor for causing materials discharged from the discharge end of said feeder conveyor to be deposited upon one of said first lateral conveyor, said inclined conveyor or said second lateral conveyor, or blown past said second lateral conveyor.

2. The apparatus of claim 1 wherein said feeder conveyor is an endless chain conveyor.

3. The apparatus of claim 2 including a slider pan positioned immediately below an upper and rearward portion of said feeder conveyor.

4. The apparatus of claim 1 wherein said first lateral conveyor includes a first side positioned approximately below the discharge end of said feeder conveyor so that materials discharged from said feeder conveyor and substantially unaffected by said air flow are deposited onto said first lateral conveyor.

5. The apparatus of claim 4 including a plurality of spaced finger members extending downwardly and rearwardly from the discharge end of said feeder conveyor means for guiding materials discharged from said feeder conveyor to said first lateral conveyor.

6. The apparatus of claim 4 wherein said first lateral conveyor includes a second side generally parallel to and spaced from said first side and said receiving end of said inclined conveyor is positioned approximately above said second side of said first lateral conveyor so that materials falling off said receiving end of said inclined conveyor will be deposited on said first lateral conveyor.

7. The apparatus of claim 1 wherein said inclined conveyor is inclined relative to a horizontal plane at an angle of between about 30° and 60°.

8. The apparatus of claim 7 wherein said inclined conveyor is inclined relative to a horizontal plane at an angle of approximately 45°.

9. The apparatus of claim 1 wherein the width of said inclined conveyor measured in a direction generally perpendicular to its direction of conveyance is approximately at least as wide as said feeder conveyor.

10. The apparatus of claim 1 wherein said second lateral conveyor includes a first side and wherein said first side of said second lateral conveyor is positioned below the discharge end of said inclined conveyor such that materials discharged from the discharge end of said inclined conveyor are deposited onto said second lateral conveyor.

11. The apparatus of claim 10 wherein said second lateral conveyor includes a second side generally parallel to and spaced from said first side of said second lateral conveyor and wherein said second side of said second lateral conveyor includes an upwardly extending material deflection surface.

12. The apparatus of claim 11 wherein the vertical position of said deflecting surface is adjustable.

13. The apparatus of claim 1 wherein said fan means is sufficient to create an air flow across substantially the entire width of said feeder conveyor.

14. The apparatus of claim 13 wherein said fan means includes an enclosed shroud for selectively directing said air flow in a desired direction.

15. The apparatus of claim 1 being mounted onto a wheel supported frame and wherein said frame includes a forward hitch for connection to a towing vehicle.

16. The apparatus of claim 15 including a forward digger means for unearthing ginseng roots and accompanying soil materials and supplying the same to a receiving end of said feeder conveyor.

17. A ginseng root harvesting apparatus comprising:
feeder conveyor having a forward feed end and a rearward discharge end for receiving ginseng roots, soil and other debris and conveying the same generally rearwardly from said feed end to said discharge end;
a first lateral conveyor extending in a direction generally transverse to said feeder conveyor and being positioned below the discharge end of said feeder conveyor;
an inclined conveyor for conveying materials from a receiving end to a discharge end along a generally upward and rearward path, said inclined conveyor being positioned above said first lateral conveyor and being provided with a plurality of projections extending outwardly from the conveying surface of said inclined conveyor;
a second lateral conveyor extending in a direction generally transverse to said feeder conveyor and being positioned below the discharge end of said inclined conveyor; and
fan means for creating an upward and rearward flow of air below the discharge end of said feeder conveyor and above said first lateral conveyor for causing materials discharged from the discharge end of said feeder conveyor to be deposited upon one of said first lateral conveyor, said inclined conveyor or said second lateral conveyor, or blown past said second lateral conveyor.

18. A ginseng root harvesting apparatus comprising:
feeder conveyor having a forward feed end and a rearward discharge end for receiving ginseng roots, soil and other debris and conveying the same generally rearwardly from said feed end to said discharge end;
a first lateral conveyor extending in a direction generally transverse to said feeder conveyor and being positioned below the discharge end of said feeder conveyor;
an inclined conveyor for conveying materials from a receiving end to a discharge end along a generally upward and rearward path, said inclined conveyor being positioned above said first lateral conveyor;
a second lateral conveyor extending in a direction generally transverse to aid feeder conveyor and being positioned below the discharge end of said inclined conveyor;
fan means for creating an upward and rearward flow of air below the discharge end of said feeder cnveyor and above said first lateral conveyor for causing materials discharged from the discharge end of said feeder conveyor to be deposited upon one of said first lateral conveyor, said inclined conveyor or said second lateral conveyor, or blown past said second lateral conveyor; and
a first inspection cnveyor and a first transport conveyor for conveying material discharged from said first lateral conveyor to said first inspection conveyor.

19. The apparatus of claim 18 wherein said first inspection conveyor extends generally transverse relative to said feeder conveyor.

20. The apparatus of claim 18 including a second inspection conveyor and a second transport conveyor for conveying material discharged from said second lateral conveyor to said second inspection conveyor.

21. The apparatus of claim 20 wherein said second transport conveyor includes a star roller conveyor section.

22. The apparatus of claim 21 wherein said first and second inspection conveyors are disposed in side by side relationship.

23. The apparatus of claim 21 wherein said star roller conveyor section is positioned above a portion of said first inspection conveyor.

24. The apparatus of claim 21 wherein said second transport conveyor is positioned vertically above said first transport conveyor.

25. The apparatus of claim 20 including a product holding bin an d a product conveyor having a first end for receiving material discharged form said second inspection conveyor and a second end for discharging product into said holding bin.

26. The apparatus of claim 25 wherein said holding bin includes a bottom conveyor means.

* * * * *